(No Model.)
J. M. PETTIT & J. W. WATT.
JUG OR JAR.
No. 526,940. Patented Oct. 2, 1894.
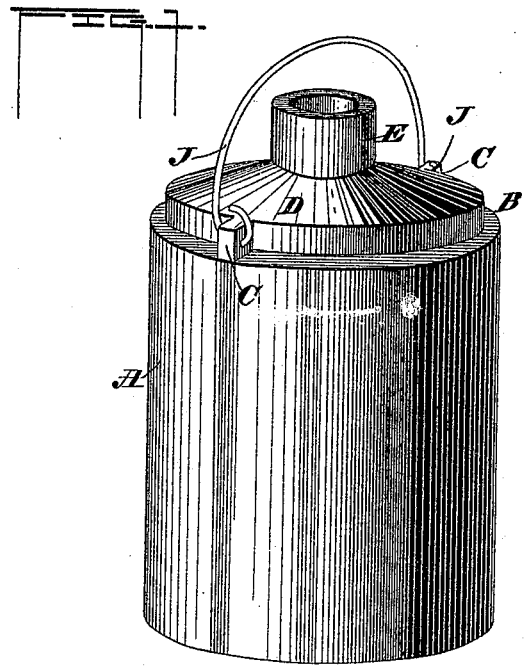
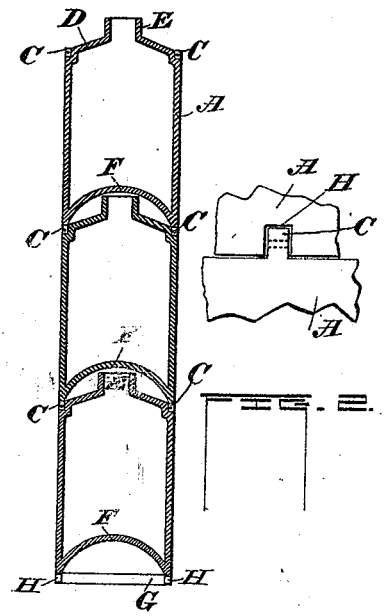
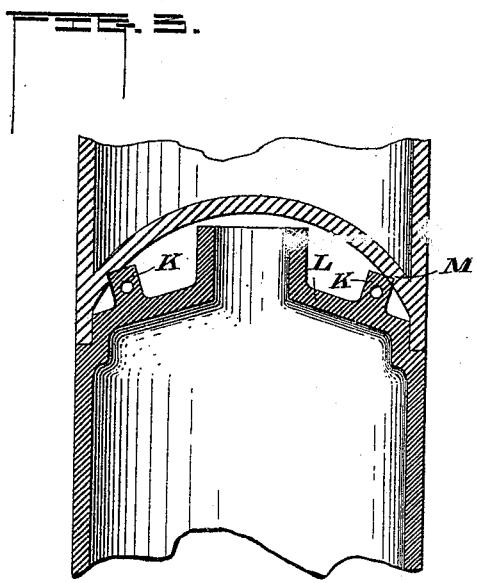
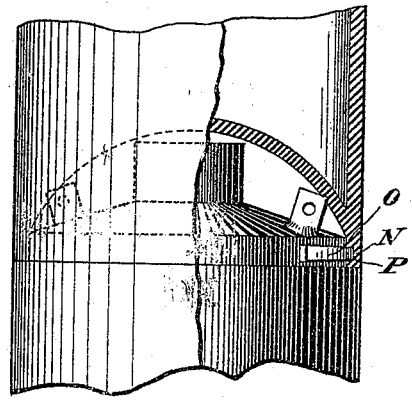
Witnesses
Frank Blair Rives
May E. Moore
John M. Pettit and
Joseph W. Watt
Inventors,
by Wm A. Moon
Attorney

UNITED STATES PATENT OFFICE.

JOHN M. PETTIT AND JOSEPH W. WATT, OF McLUNEY, OHIO.

JUG OR JAR.

SPECIFICATION forming part of Letters Patent No. 526,940, dated October 2, 1894.

Application filed May 29, 1894. Serial No. 512,930. (No model.)

*To all whom it may concern:*

Be it known that we, JOHN M. PETTIT and JOSEPH W. WATT, citizens of the United States, residing at McLuney, in the county of Perry and State of Ohio, have invented certain new and useful Improvements in Jugs or Jars; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our invention relates to improvements in jugs or jars, of that class made of clay, the object of our invention being the production of a jug or jar which can be easily nested or piled in vertical rows to be burned; which will be of simple, durable and inexpensive construction and thus prove a practical improvement.

The invention consists of a jug or jar embodying certain novel features of construction substantially as described and shown in the accompanying drawings.

Figure 1 represents a perspective view of our improved jug or jar. Fig. 2 represents a sectional view showing a series of the jugs nested or piled as they are placed in the kiln. Fig. 3 represents a sectional view of a modified form of our jug, and Fig. 4 represents a sectional view of another modified form of the jug.

Our improved jug or jar is of very simple construction and consists of the body A, having at the upper portion the annular recess B, provided with the diametrically opposite ears or lugs C, and the conical top D, having the spout E. The body is provided with the dished or concaved bottom F, having the annular rim G, which is provided with the diametrically opposite recesses or seats H, which when the jugs are nested receives the ears C, on the top of the body and in this manner the jugs can be easily nested and retained together and the lugs or ears are formed with an opening in which is received the ends of the bail or handle J, and by this construction the ears form the retaining devices as well as the ears for the handle.

In the form of our jug shown in Fig. 3 we place the handle ears K, on the conical top L, of the jug and they fit in sockets M, in the bottom of the jug when nested, and in the form shown in Fig. 4 we provide the annular recess or channel N, of the jug with a spiral tongue O, which fits in the groove P, in the bottom of the jug.

It is evident that we provide a jug which can be easily made and which possesses all the features of merit calculated to commend it as useful and practical.

We claim—

1. As a new article of manufacture, a jug or jar having the annular recess or channel near the top, the ears arranged in said channel, and the concaved bottom having the annular flange or rim provided with the recesses or seats to receive said ears.

2. As a new article of manufacture, a jug or jar having an annular channel at the top thereof, lugs on the top of the jug and also in the channel and having the bottom formed with notches to receive the lugs and hold the jugs when nested.

In testimony whereof we affix our signatures in presence of two witnesses.

JOHN M. PETTIT.
JOSEPH W. WATT.

Witnesses:
H. L. PRICE,
W. H. EVELAND.